Oct. 16, 1962   D. S. DICKINSON   3,058,739
HYDRAULIC CONTROL UNITS FOR VEHICLE SUSPENSIONS
Filed Oct. 16, 1961   4 Sheets-Sheet 1
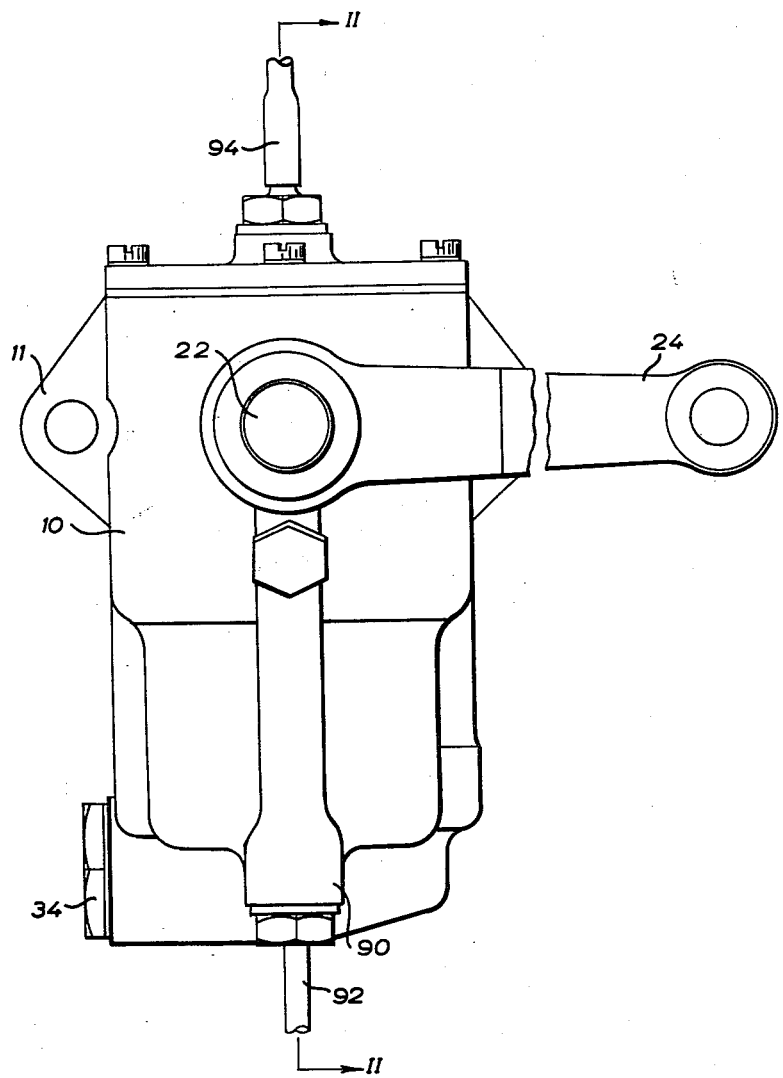
—FIG. 1.—
INVENTOR:
RONALD SIDNEY DICKINSON
BY
Mead, Browne, Schuyler + Beveridge,
Attorneys

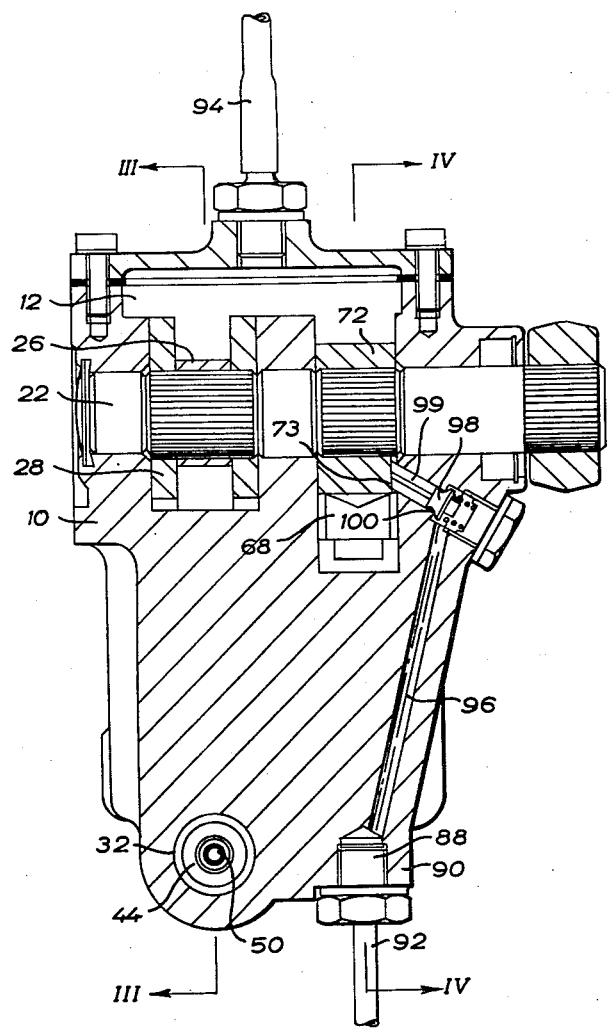
—FIG. 2.—
INVENTOR:
RONALD SIDNEY DICKINSON
BY
Mead, Browne, Schuyler + Beveridge,
Attorneys

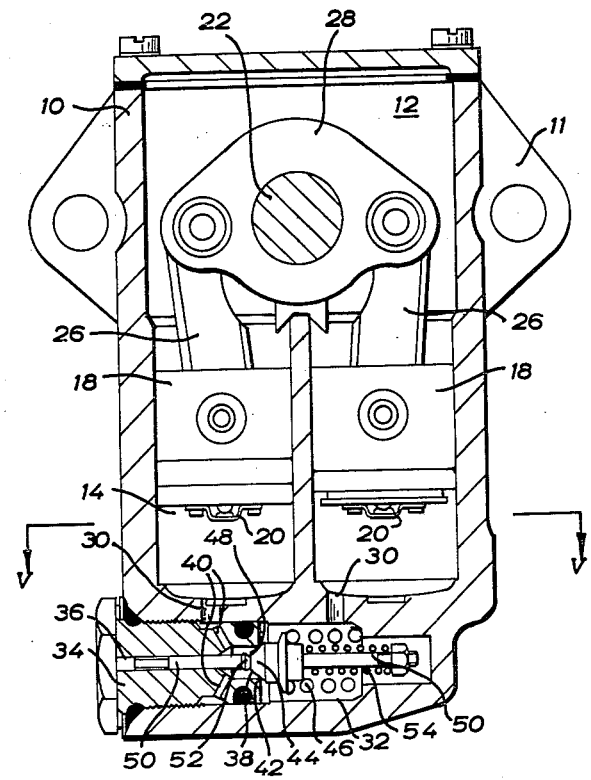
— FIG. 3. —
INVENTOR:
RONALD SIDNEY DICKINSON
BY
Mead, Browne, Schuyler + Beveridge,
Attorneys

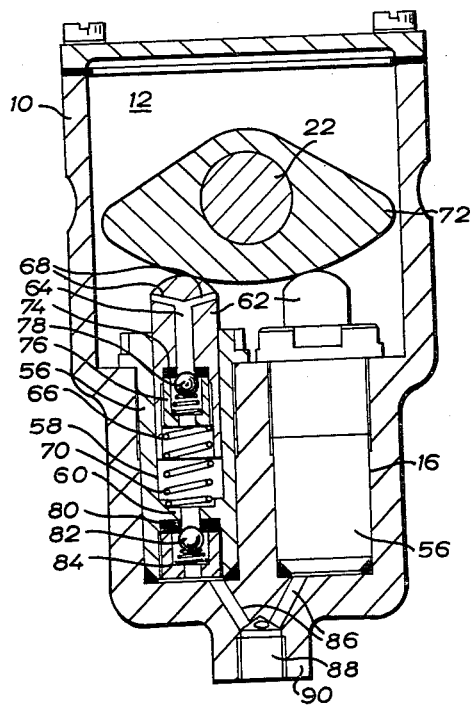
—FIG. 4.—
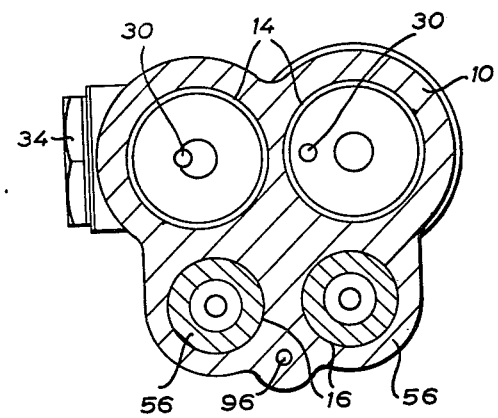
—FIG. 5.—
INVENTOR:
RONALD SIDNEY DICKINSON
BY
Mead, Browne, Schuyler + Beveridge,
Attorneys

United States Patent Office 3,058,739
Patented Oct. 16, 1962

3,058,739
HYDRAULIC CONTROL UNITS FOR VEHICLE SUSPENSIONS
Ronald Sidney Dickinson, Osbaldwick, York, England, assignor to Armstrong Patents Co. Limited, London, England, a British company
Filed Oct. 16, 1961, Ser. No. 145,301
Claims priority, application Great Britain Nov. 17, 1960
3 Claims. (Cl. 267—15)

This invention concerns hydraulic control units for road vehicle suspensions.

It is recognised that the spring suspension system of a road vehicle must be provided with means for damping excessive spring movements, and to this end, it is customary to provide such a system with a number of shock absorbers, usually of a hydraulic nature. More recently, proposals have been made for incorporating load-compensating means in spring suspension systems, designed to adjust the spring characteristic to the instantaneous load carried by the vehicle, usually with a view to maintaining the vehicle frame level and at a predetermined mean riding height, irrespective of the value of the load. Such load-compensating means are also frequently of a hydraulic or a hydropneumatic nature.

The invention seeks to provide a hydraulic control unit for a vehicle spring suspension system which will facilitate the application of hydraulic damping and load-compensation to said suspension system.

In its broadest aspect, the present invention accordingly provides a hydraulic control unit for a vehicle spring suspension system wherein a lever-operated hydraulic shock absorber having at least one damping element reciprocable in a hydraulic cylinder consequently upon oscillatory movement of said suspension system and a hydraulic pump having a pumping element actuated responsive to the same oscillatory movements are both arranged in a common housing and receive said oscillatory movements from a common rockable spindle journalled in said housing and connectable to said suspension system, said housing being formed with a common internal chamber for supplying hydraulic medium to said shock absorber and said hydraulic pump, and with an outlet for delivering hydraulic medium from said pump externally of said housing.

More particularly, a preferred hydraulic control unit according to the present invention comprises a housing presenting an internal chamber and a pair of hydraulic cylinders each communicating at one end with said chamber and each having a piston reciprocable therein; passage means in ecah piston including a non-return valve for passing hydraulic medium from said chamber through said piston and into said hydraulic cylinder, a hydraulic connection between the other ends of said cylinders and including fluid flow restricting means for restricting the flow of hydraulic medium between said cylinders, at least one hydraulic pump cylinder in said housing, said pump cylinder also communicating at one end with said internal chamber of said housing, a pumping element reciprocable in said pump cylinder, said pumping element having a through bore therein for passing hydraulic medium from said chamber into said pump cylinder, pump inlet and outlet valve means in said pump cylinder, an outlet in said housing for recovering hydraulic medium from said pump cylinder, a common rockable spindle journalled in said housing for turning movement relative thereto, said spindle extending within said internal chamber, and means respectively connecting said common spindle with said hydraulic pistons and with said pumping element for reciprocating the same within their respective cylinders responsive to turning movement of said shaft.

The control unit proposed by the invention thus combines in one single housing the functions of a hydraulic shock absorber and of a hydraulic pump which, in consequence of oscillatory movements of the spring suspension system, is capable of delivering hydraulic medium under pressure for use externally of said housing. The internal chamber with which the housing is formed may constitute a reservoir for the hydraulic medium, or it may be adapted for connection to an external reservoir and thus itself function simply as an intermediate, low pressure supply chamber.

Whilst the supply of hydraulic medium under pressure which is thus made available by the control unit may be employed for operating a hydraulically actuated power steering mechanism or a power-assisted clutch mechanism, it is preferred to use it for operating a spring suspension system incorporating hydraulically actuated load-compensating means for maintaining the vehicle frame level and at a predetermined riding height irrespective of the load carried by the vehicle.

The invention will be described further by way of example, with reference to the accompanying drawings, in which:

FIG. 1 is a front elevation of a hydraulic control unit embodying the invention;

FIG. 2 is a central, vertical section on the line II—II of FIG. 1;

FIG. 3 is a vertical section taken on the line III—III of FIG. 2;

FIG. 4 is a similar section taken on the line IV—IV of FIG. 2; and

FIG. 5 is a horizontal section taken on the line V—V of FIG. 3.

In the control unit shown in the drawings a housing 10 is formed with an upper chamber 12 for containing a supply of hydraulic medium and with two pairs of hydraulic cylinders 14 and 16 opening from the chamber 12 and extending into the lower part of the housing 10.

Each of the cylinders 14 receives a hollow, sliding piston 18 having a non-return or recuperation valve 20 adapted, on an upward stroke of the piston in the cylinder, to allow hydraulic medium from the chamber 12 to pass into the lower part of the cylinder 14 below the piston 18. Within the housing 10 is journalled a rockable spindle 22 which extends through the chamber 12 above the cylinders 14 and 16, and which projects externally of the housing to receive a lever arm 24 connectable to an appropriate point of the vehicle spring suspension, whereby vehicle riding movements are transmitted to the spindle. This spindle 22 is connected to the piston 18 by means for connecting rods 26 which are pivotably secured to a crank-plate 28 carried by the spindle and extending symmetrically on either side thereof, so that as the spindle is rocked in the housing 10 responsive to vehicle riding movements, the pistons 18 are oscillated in their cylinders 14.

The bottom end of each cylinder 14 is connected by a short bore 30 to a valve chamber 32 formed transversely of the cylinders in the lower part of the housing. The valve chamber 32 is closed at its outer end by means of a threaded plug 34 which is axially bored at 36, counterbored at its inner end 38, and provided with oblique passages 40 placing the bore 30 of the adjoining cylinder 14 in communication wth the valve chamber 32. The free end of the counterbore 38 is surrounded by a valve seat 42 formed at the inner end of the plug 34, and a first damping valve member 44 is urged by means of a spring 46 into closing relation on the seat 42. An axial bore (not shown) is also formed through the valve member 44, and is surrounded at its end remote from the spring 46 by a second valve seat 48. Through this bore of valve member 44 passes the spindle 50 of a second damping valve member 52 which is urged by means of a spring 54 against the seat 48.

As thus far described, the structure provided by the invention constitutes a hydraulic shock absorber or damper, in that oscillation of the pistons 18 responsive to vehicle riding movements causes a flow of hydraulic medium between the cylinders 14, by way of the valve chamber 32, and the rate of such flow is restricted by the valves 44 and 52. The valve member 44 and/or the valve seat 42 may be appropriately relieved, as by notching, to provide a sufficiently large flow path for small quantities of hydraulic medium to pass from one cylinder 14 to the other without either of the valves 44 or 52 lifting, that is to say, when the vehicle is riding on a relatively smooth surface and is not subjected to any significant surface irregularities. Any loss of hydraulic medium which may occur from the cylinders 14 is made up from the chamber 12 through the recuperation valves 20.

Turning now more particularly to FIG. 4 of the drawings, it will be noted that in each of the hydraulic cylinders 16 there is threadedly engaged a capsule 56 which is formed with an axial bore 58 wherein is provided, intermediate the ends of the capsule, an internal annular flange 60. Within each bore 58 is slidably arranged a pump plunger 62 formed with an axial bore 64 and a counterbore 66, and with oblique passages 68 leading from the bore 64 to the chamber 12, into which the upper end of each plunger is urged by means of a spring 70 bearing on the flange 60. Transversely across the cylinders 16, the spindle 22 carries a symmetrical cam 72, and the spring 70 maintains the upper ends of plungers 56 against this cam.

The junction between the bore 64 and counterbore 66 of each plunger is provided with a valve seat 74, and the adjoining region of the counterbore 66 is threaded to receive an apertured nut 76 carrying a spring-loaded valve ball 78 engaging the seat 74, the combination constituting a pump inlet valve. A pump outlet or delivery valve is similarly formed by a valve seat 80 provided below the flange 60, and a valve ball 82 spring-loaded against said seat and carried within an apertured nut 84 threadedly engaged in the adjoining portion of the capsule bore 58 and opening into the bottom end of the cylinder 16. The said end of each cylinder 16 is connected by way of a passage 86 to a delivery chamber 88 of an outlet connection 90 of the housing 10.

Thus, in operation, with the outlet connection 90 connected by a conduit 92 to a mechanism requiring a supply of hydraulic medium, as the plungers 62 are reciprocated by the cam 72 responsive to vehicle riding movements, hydraulic medium from the chamber 12 flows on each upward stroke of a plunger past the inlet valve member 78 thereof and into the pump chamber defined between that valve member and the delivery valve member 82. On the subsequent downward stroke of the plunger 62, the delivery valve member 82 then lifts to pass the hydraulic medium from the pump chamber to the passage 86 and the delivery chamber 88 of outlet connector 90, from which it is delivered by the conduit 92 to the said mechanism.

The invention thus provides a control unit wherein a common spindle 22 operates both a hydraulic shock absorber and a hydraulic pump constituting a source of hydraulic medium under pressure, and both the shock absorber and the pump are supplied with hydraulic medium from the common low pressure supply chamber 12. In this connection, it will be appreciated that the chamber 12 may constitute an integral internal reservoir of the control unit, or it may, as shown in FIGS. 1 and 2, be connected by a conduit 94 to an independent external reservoir.

As already mentioned, the preferred application of the invention is to a vehicle spring suspension wherein load-compensating means are provided to enable the riding height of the vehicle frame to be maintained substantially constant irrespective of variations in the load carried by the vehicle. Frequently, this is effected by adjusting the attitude of the suspension spring means relative to the vehicle frame, and this in turn may be accomplished by interposing a hydraulic ram between a spring and the vehicle frame, the ram actually being incorporated, if desired, in the means securing the spring to the frame. The control unit proposed by the invention is particularly suitable for use in such an arrangement, for supplying hydraulic medium under pressure to the ram, and may additionally be provided with height-sensitive means for determining whether further hydraulic medium is to be supplied to the ram, or whether some of the hydraulic medium already supplied to the ram requires to be exhausted therefrom.

For this purpose, as most readily seen in FIG. 2, the housing 10 is formed with a passage 96 extending between the chamber 12 and the chamber 88, and this passage 96 includes a hydraulic relief valve comprising a valve member 98 urged by spring means against a valve seat 100 formed in said passage. The cam 72 is formed with a recessed cam face 73, and the axially bored spindle 99 of valve member 98 normally bears against the cam face 73. In use, the control unit is secured by means of lugs 11 to a convenient part of the vehicle frame, and the lever arm 24 is connected to some suitable point in the wheel mounting. Thus, the lever arm 24, by its angular position relative to the housing 10, gives a measure of the distance between the vehicle frame and wheel mounting, and is normally set to be substantially horizontal when that distance corresponds to the desired riding height of the frame. In this position of the lever arm 24, the cam 72 is arranged in such a manner on the spindle 22 that the cam face 73 is just incident upon the valve spindle 99, so that the valve member 98 is closed against the seat 100 and all hydraulic medium delivered by the pump to the chamber 88 passes into the conduit 92. If now the cam 72 is moved away from this predetermined position due to a reduction in the load carried by the vehicle, which causes the distance between the frame and the wheel mounting to increase, then the cam face 73 moves away from the valve spindle 99, which is thus axially displaced to lift the valve member 98 off its seat. This has the effect firstly of causing hydraulic medium which is delivered to the chamber 88 by the pump simply to be transferred back along the passage 96 to the chamber 12, and secondly of allowing hydraulic medium to exhaust back along its conduit 92 and through passage 96 to the chamber 12, allowing the ram to collapse somewhat. As this collapsing movement of the ram continues, however, the distance between the vehicle frame and wheel mounting decreases again, thus restoring the lever arm 24, spindle 22 and cam 72 towards their normal mean positions, until ultimately the cam face 73 is again incident upon the valve spindle 99. Thereafter, continued pumping allied to repeated momentary openings of the valve 98 combined to maintain the desired riding height until such time as another load change occurs.

In the converse case, when the load carried by the vehicle increases to reduce the spacing between the vehicle frame and wheel mounting, the angular displacement resulting in the cam 72 is such as to bring the cam face 73 wholly into register with the valve spindle 99, so that the valve member 98 remains continually closed against its seat 100. Hydraulic medium delivered by the pump to the chamber 88 is thus passed along the conduit 92 to the ram, which is consequently extended to restore the desired spacing between the vehicle frame and wheel mounting. When this has been achieved, the cam 72 is once more brought back to its mean position, wherein the cam face 73 is just incident upon the valve spindle 99.

I claim:

1. A hydraulic control unit for a vehicle spring suspension system, comprising a housing presenting an internal chamber and a pair of hydraulic cylinders each communicating at one end with said chamber and each having a piston reciprocable therein; passage means in each piston including a non-return valve for passing hydraulic medium from said chamber through said piston and into said hydraulic cylinder, a hydraulic connection between the other ends of said cylinders and including fluid flow restricting means for restricting the flow of hydraulic medium between said cylinders, at least one hydraulic pump cylinder in said housing, said pump cylinder also communicating at one end with said internal chamber of said housing, a pumping element reciprocable in said pump cylinder, said pumping element having a through bore therein for passing hydraulic medium from said chamber into said pump cylinder, pump inlet and outlet valve means in said pump cylinder, an outlet in said housing for recovering hydraulic medium from said pump cylinder, a common rockable spindle journalled in said housing for turning movement relative thereto, said spindle extending within said internal chamber, and means respectively connecting said common spindle with said hydraulic pistons and with said pumpng element for reciprocating the same within their respective cylinders responsive to turning movement of said shaft.

2. A hydraulic control unit as set forth in claim 1, further comprisng passage means including a plunger-operated hydraulic release valve connecting said outlet means with said common internal chamber, and means for actuating the operating plunger of said valve responsive to the angular position of said spindle relative to said housing, whereby to open said valve and by-pass the pump output to said chamber whenever said pump attains a predetermined angular position relative to said housing.

3. A hydraulic control unit as set forth in claim 2, wherein the means connecting the pump element with the spindle is carried by said spindle and comprises cam means constituting said valve plunger actuating means, the valve plunger being directed to bear on said cam means.

References Cited in the file of this patent

UNITED STATES PATENTS 2,970,831     Wordsworth _____ Feb. 7, 1961
2,970,832     Wordsworth _____ Feb. 7, 1961

OTHER REFERENCES

Auer: German application, 1,007,191, printed April 25, 1957 (kl 63c 50).